Figure 1:
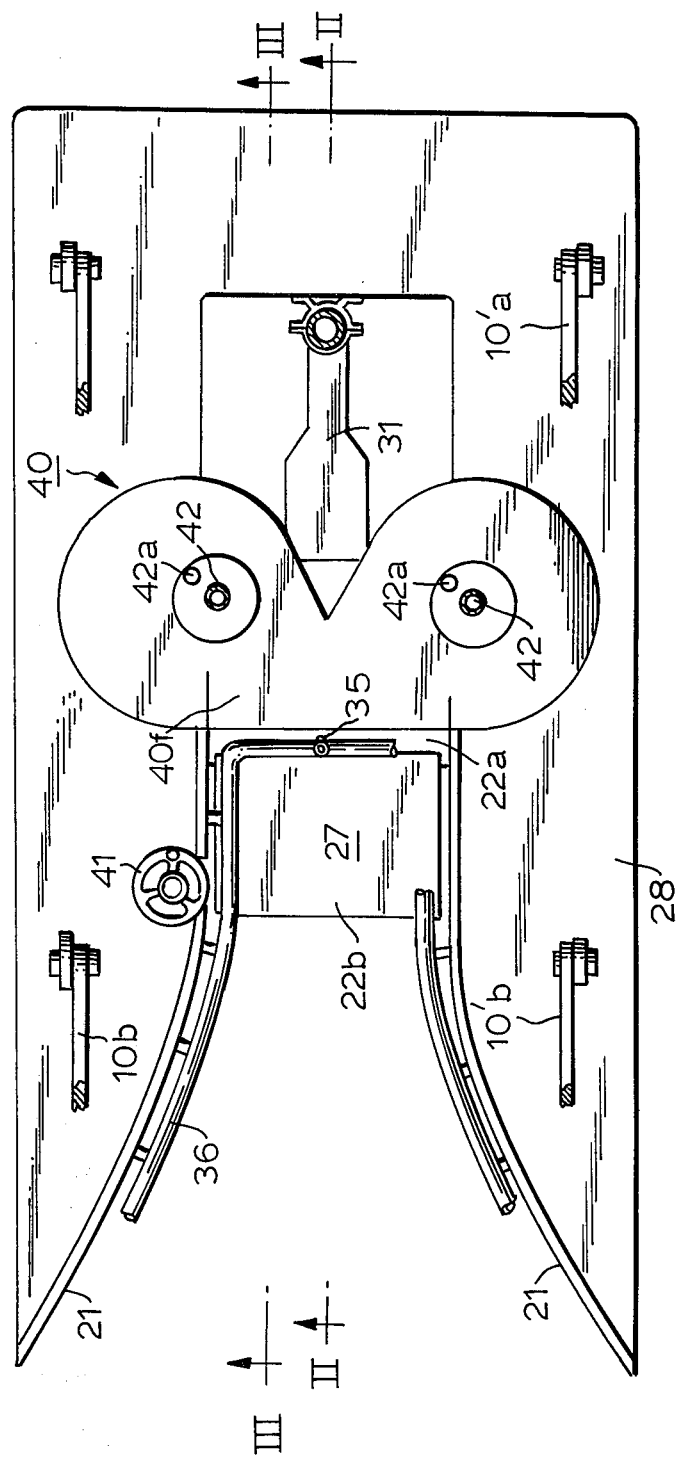

United States Patent [19]

Seike et al.

[11] 4,136,030
[45] Jan. 23, 1979

[54] APPARATUS FOR COLLECTING EFFLUENT OIL

[75] Inventors: Yajuro Seike; Yoshikuni Matsuo; Masaru Nakashima; Toshikazu Shojima; Shinohara Masaaki, all of Nagasaki, Japan

[73] Assignee: Mitsubishi Jukogyo Kabushiki Kaisha, Tokyo, Japan

[21] Appl. No.: 879,108

[22] Filed: Feb. 17, 1978

[30] Foreign Application Priority Data

Feb. 21, 1977 [JP] Japan .................. 52-17088

[51] Int. Cl.² .................. B01D 37/00; E02B 15/04
[52] U.S. Cl. .................. 210/242 S; 210/DIG. 25
[58] Field of Search ....... 210/83, 84, 242 S, DIG. 25, 210/DIG. 26

[56] References Cited

U.S. PATENT DOCUMENTS

| | | | |
|---|---|---|---|
| 3,812,968 | 5/1974 | Aramaki et al. | 210/242 S |
| 3,875,062 | 4/1975 | Rafael | 210/242 S |
| 3,909,417 | 9/1975 | Rafael | 210/242 S |
| 3,951,810 | 4/1976 | Crisafulli | 210/242 S |
| 3,966,615 | 6/1976 | Petchul et al. | 210/DIG. 25 |
| 4,033,869 | 7/1977 | McGrew | 210/242 S X |

Primary Examiner—Robert H. Spitzer

[57] ABSTRACT

Improvements are made in the known apparatus for collecting effluent oil of the type such that the apparatus includes a pair of left and right side plates disposed at a predetermined distance in a forwardly opened arrangement, a weir plate mounted to said side plates as inclined in a rear-downward direction so that its opposite side edges may contact with the inner wall surfaces of said respective side plates under a water surface, a slant plate disposed with its rear end positioned above the rear end of said weir plate at the rear ends of said side plates and having its opposite side edges fixedly secured to the inner wall surfaces of said side plates, an oil leakage preventing plate positioned in the midway between the rear end of said weir plate and the rear end of said slant plate and having its opposite side edges fixedly secured to the inner wall surfaces of said side plates to form a water discharge port between said oil leakage preventing plate and the rear end of said weir plate and to form an oily water intake port between said oil leakage preventing plate and the rear end of said slant plate, an oily water intake pipe communicated with said oily water intake port, a pair of left and right wave buffer chambers which are of substantially cylindrical shape having their top and bottom ends closed and having their side walls partly cut away, and float means mounted to said side plates. The improvements exist in that said slant plate is appropriately inclined in an obliquely rear-upward direction with its rear end extended into said wave buffer chambers, and that between said wave buffer chambers and an oil pool formed as delimited by said side plates, weir plate and oil leakage preventing plate is provided a water conduit path for communicating therebetween.

1 Claim, 14 Drawing Figures

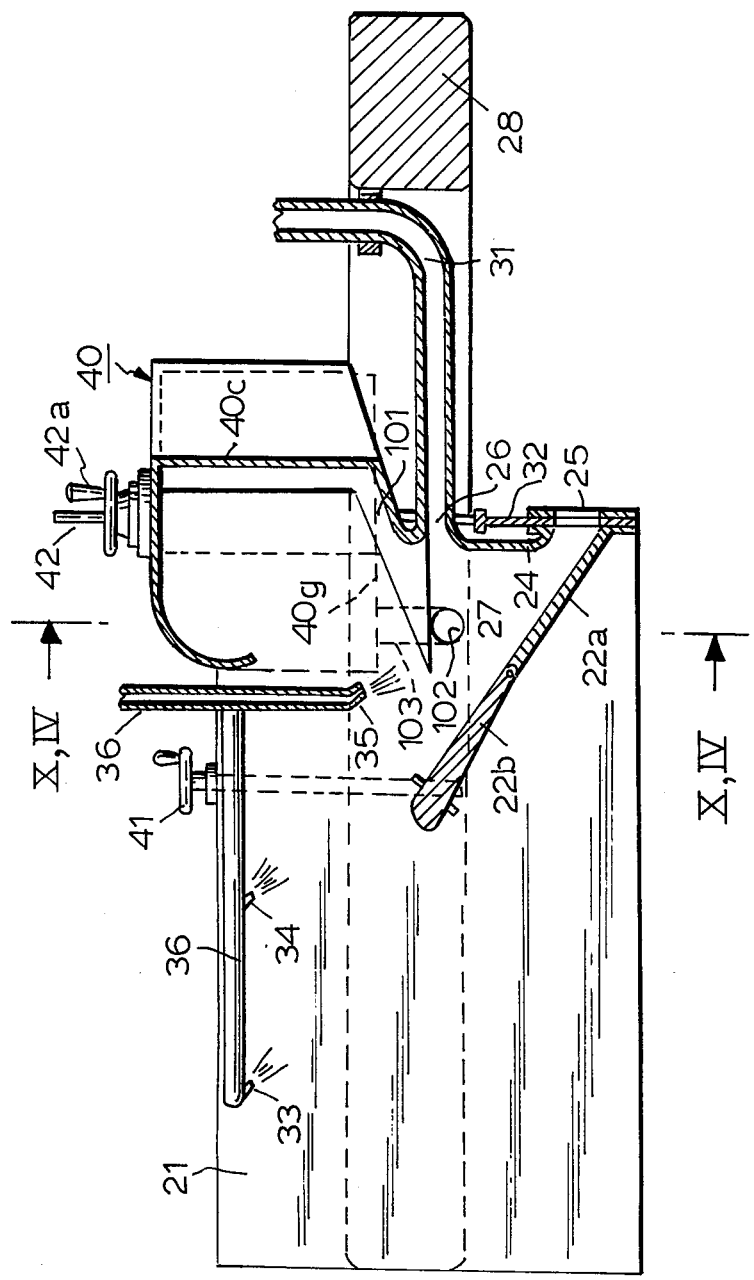

APPARATUS FOR COLLECTING EFFLUENT OIL

The present invention relates to improvements in an apparatus for collecting effluent oil.

Heretofore, an apparatus for collecting effluent oil on a water surface has been proposed, and examples are disclosed in our earlier U.S. Pat. Application Ser. No. 780,351 filed Mar. 23, 1977. An improved apparatus for collecting effluent oil disclosed in that U.S. Pat. Application comprises an oil pool delimited by a pair of forwardly opening side plates, a weir plate mounted between the side plates as inclined in a rear-downward direction so as to allow only an oily water layer in the vicinity of a water surface to pass into the oil pool beyond the top edge of said weir plate, and a slant plate and an oil leakage preventing plate both disposed at the rear end of said oil pool; and a pair of wave buffer chambers of substantially cylindrical shape which communicate with said oil pool to absorb and attenuate kinetic energy possessed by the wave of the oil and water flowing into said oil pool.

However, the above-referred apparatus for collecting effluent oil in the prior art had a disadvantage that since the slant plate delimiting a part of the rear end of the oil pool was inclined in a rear-downward direction, the wave striking against the slant plate might be possibly reflected forwardly or a forwardly traveling water wave might be possibly generated by the upward and downward movements of the entire apparatus, resulting in the phenomenon that the collected oil which had once entered the oil pool would be forced back in the forward direction, and after all, the collecting efficiency for the effluent oil was lowered. Furthermore, there was an additional disadvantage that since the inlet ports and outlet ports of the wave buffer chambers were provided in common, the oily water flowing into the wave buffer chambers might possibly collide against the oily water flowing out of the wave buffer chambers, and thereby smooth flow of an oil layer 18 on the surface of the water in the oil pool into an oil tank on an operation vessel, was prevented.

Therefore, it is one object of the present invention to provide an apparatus for collecting effluent oil which is free from the above-described disadvantages in the prior art and which can efficiently collect effluent oil floating on a water surface.

According to one feature of the present invention, there is provided an apparatus for collecting effluent oil including a pair of left and right side plates disposed at a predetermined distance in a forwardly opened arrangement, a weir plate mounted to said side plates as inclined in a rear-downward direction so that its opposite side edges may contact with the inner wall surfaces of said respective side plates under a water surface, a slant plate disposed with its rear end positioned above the rear end of said weir plate at the rear ends of said side plates and having its opposite side edges fixedly secured to the inner wall surfaces of said side plates, an oil leakage preventing plate positioned in the midway between the rear end of said weir plate and the rear end of said slant plate and having its opposite side edges fixedly secured to the inner wall surfaces of said side plates to form a water discharge port between said oil leakage preventing plate and the rear end of said weir plate and to form an oily water intake port between said oil leakage preventing plate and the rear end of said slant plate, an oily water intake pipe communicated with said oily water intake port, a pair of left and right wave buffer chambers which are of substantially cylindrical shape having their top and bottom ends closed and having their side walls partly cut away, and float means mounted to said side plates, characterized in that said slant plate is appropriately inclined in an obliquely rear-upward direction with its rear end extended into said wave buffer chambers, and that between said wave buffer chambers and an oil pool formed as delimited by said side plates, weir plate and oil leakage preventing plate, is provided a water conduit path for communicating therebetween.

Figure 2:
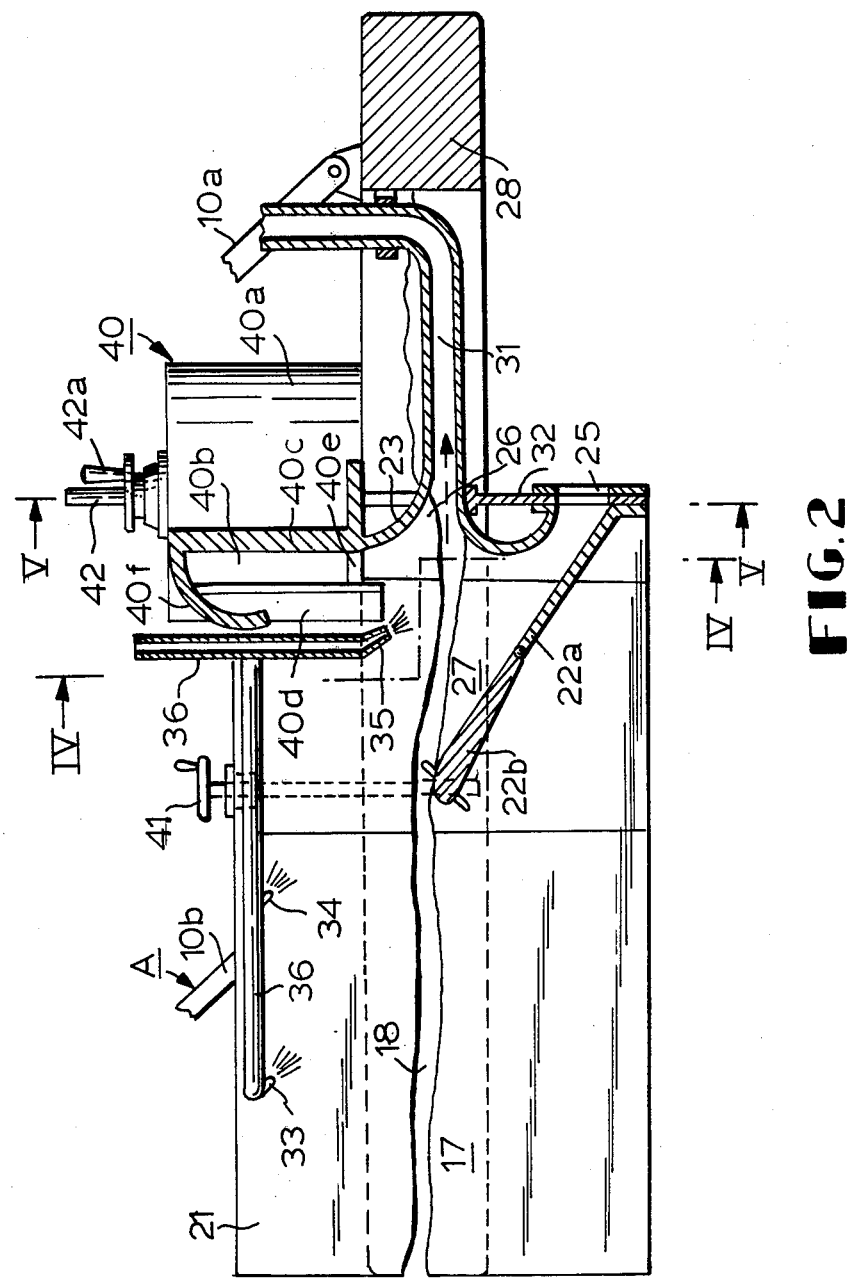
Figure 3:
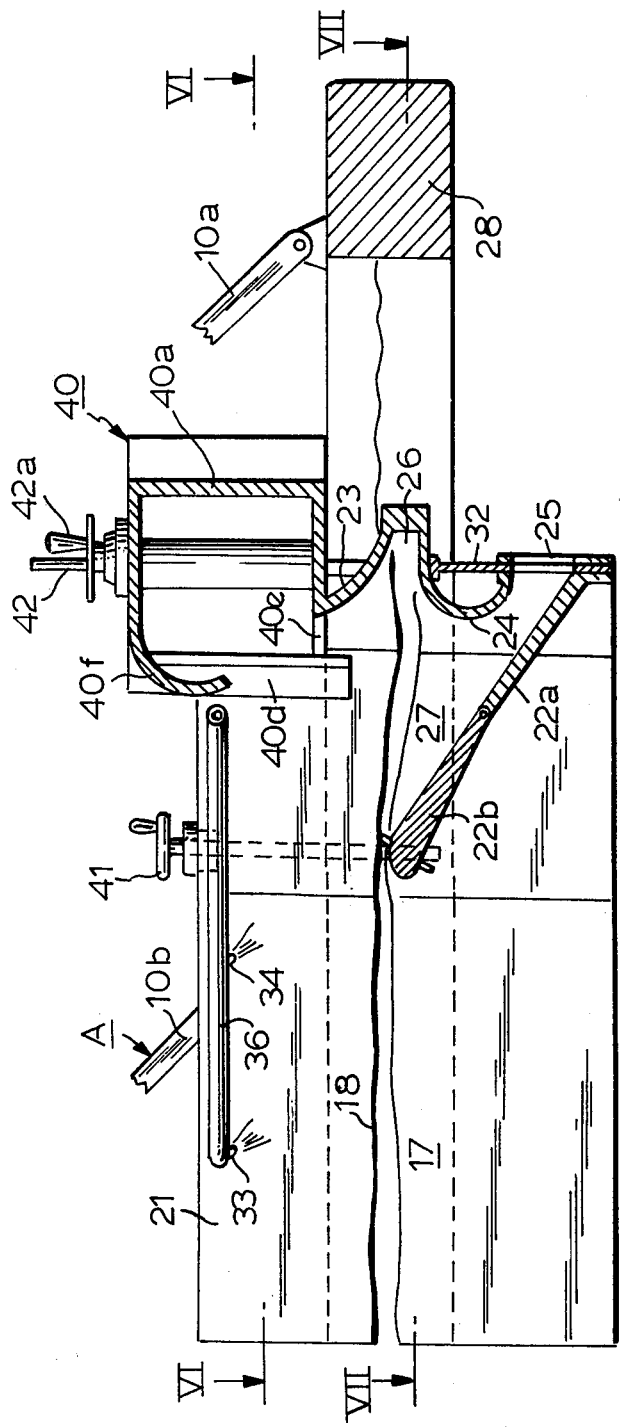
Figure 4:
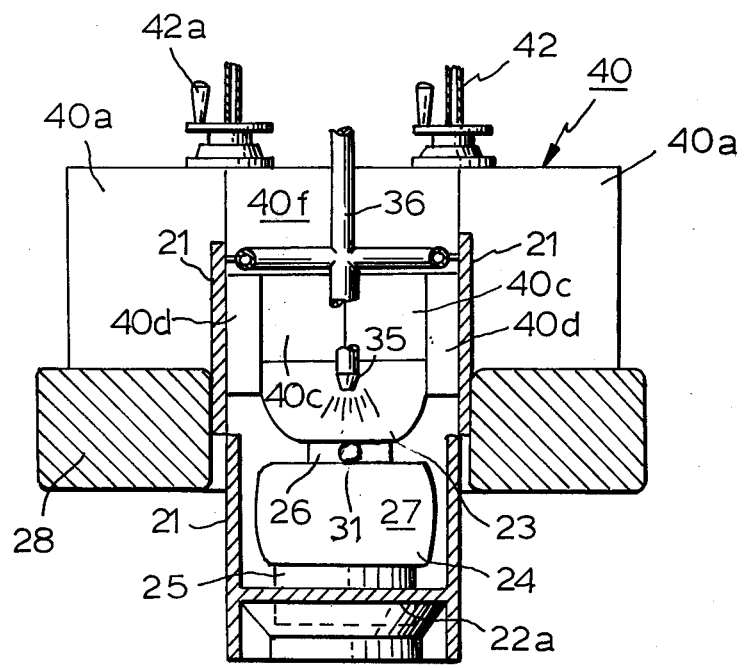
Figure 5:
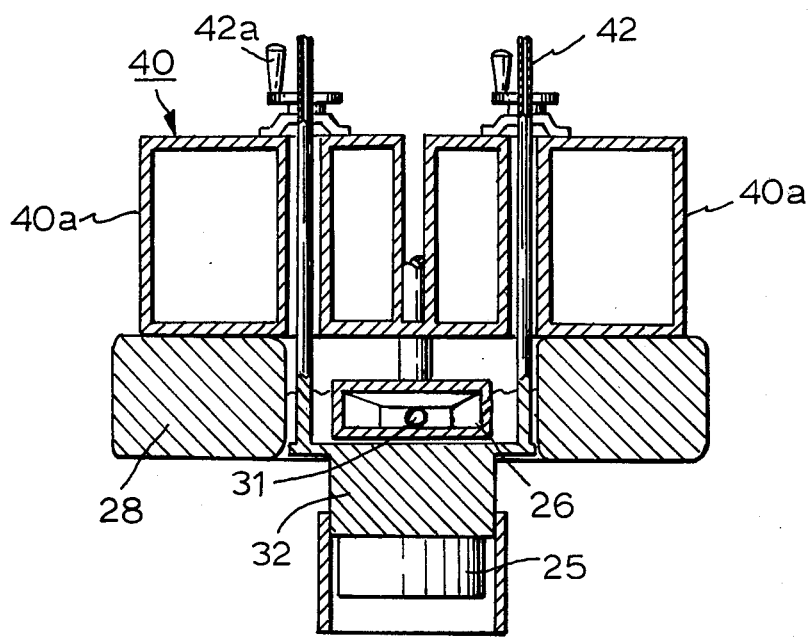
Figure 6:
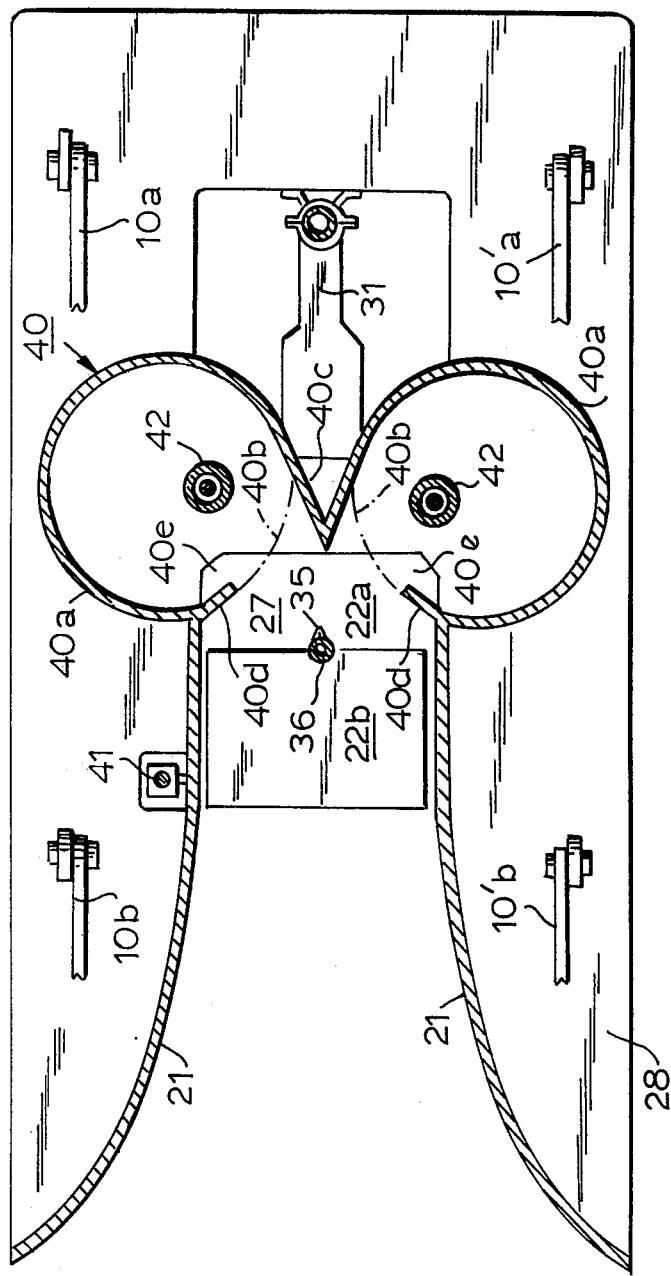
Figure 7:
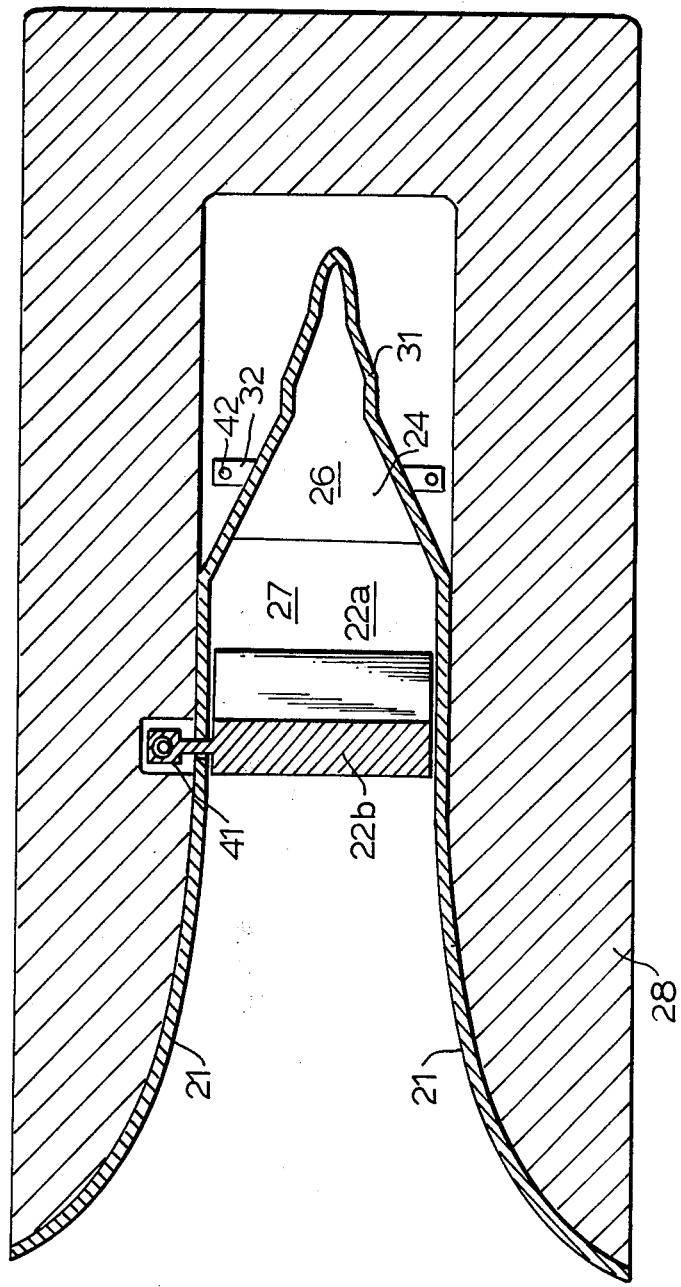
Figure 8:
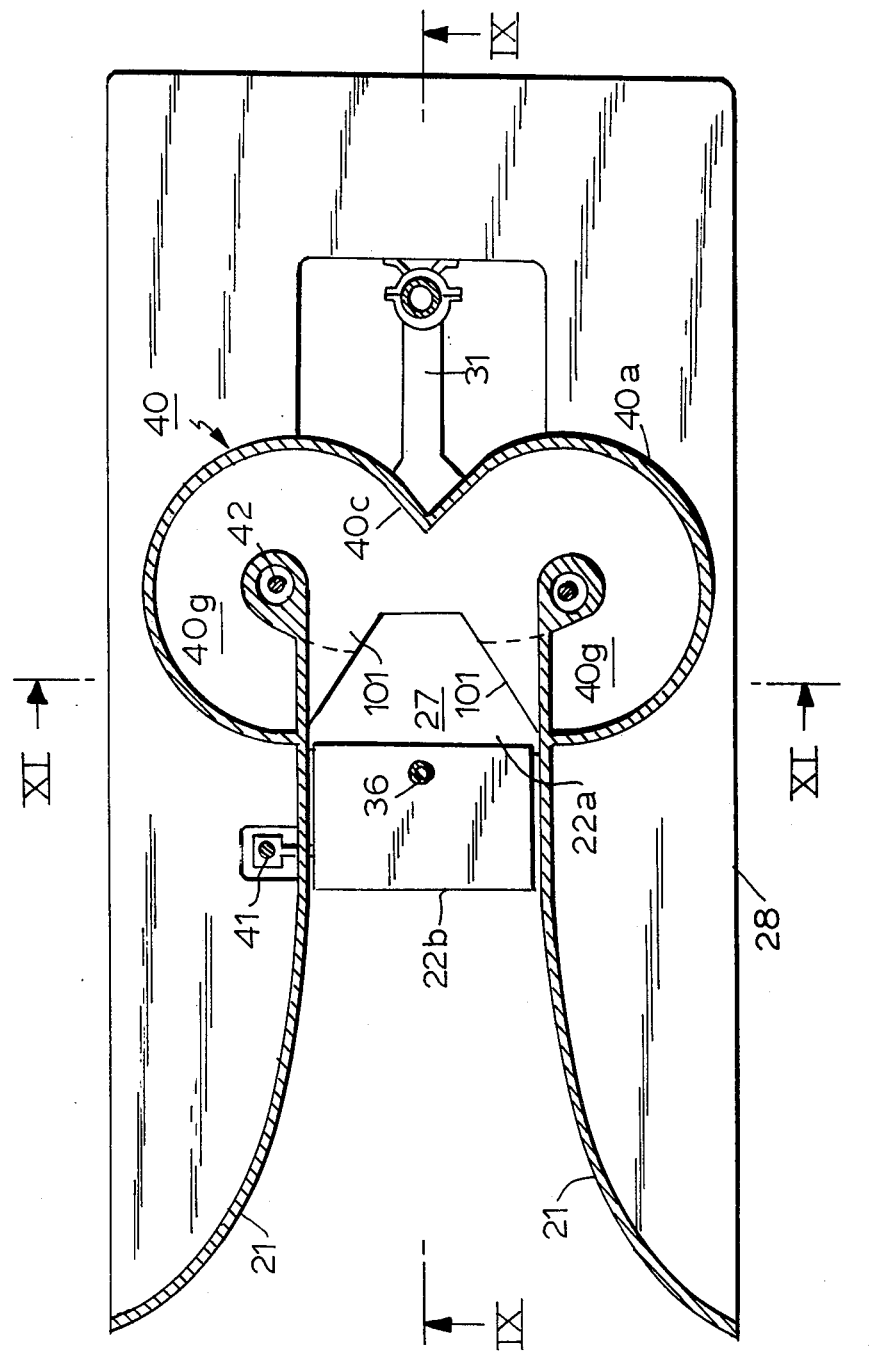
Figure 9:
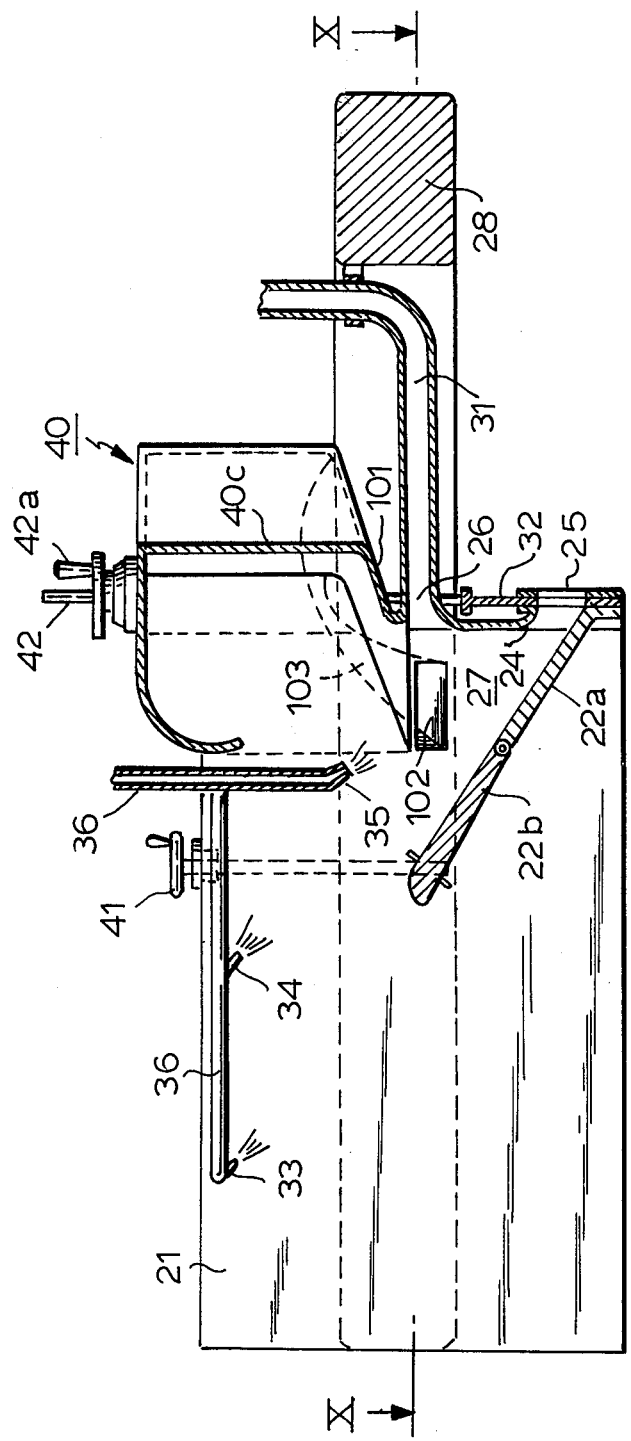
Figure 10:
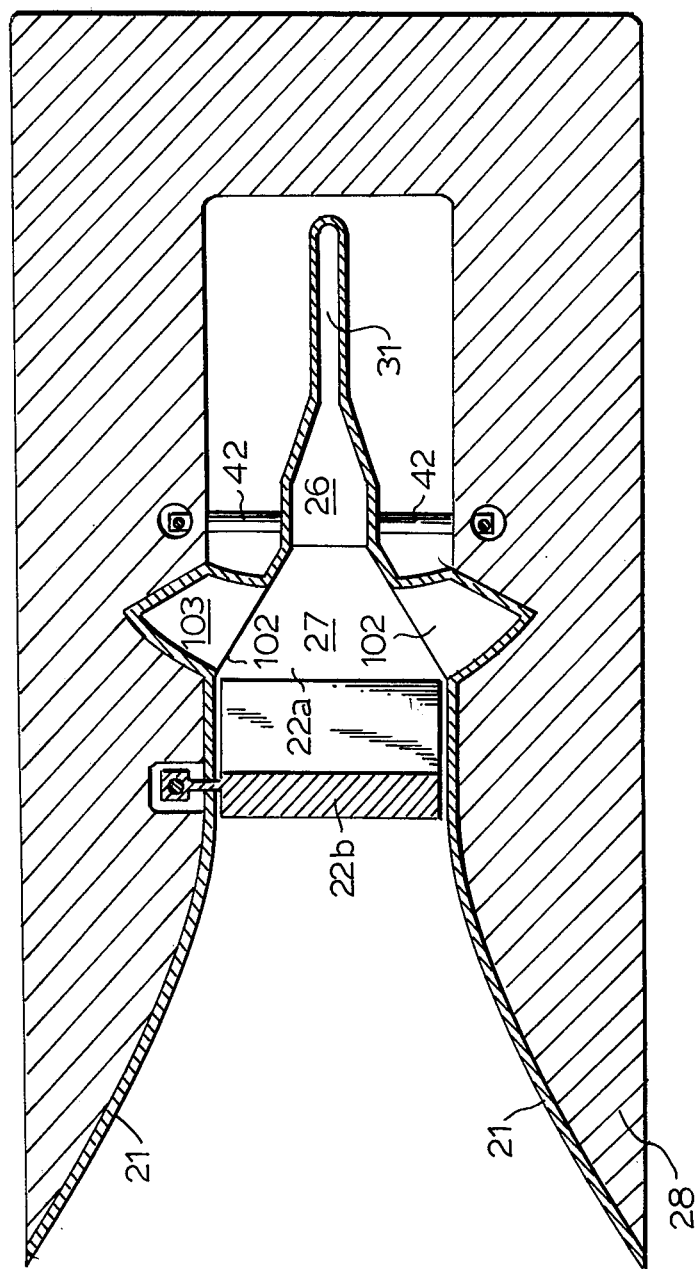
Figure 11:
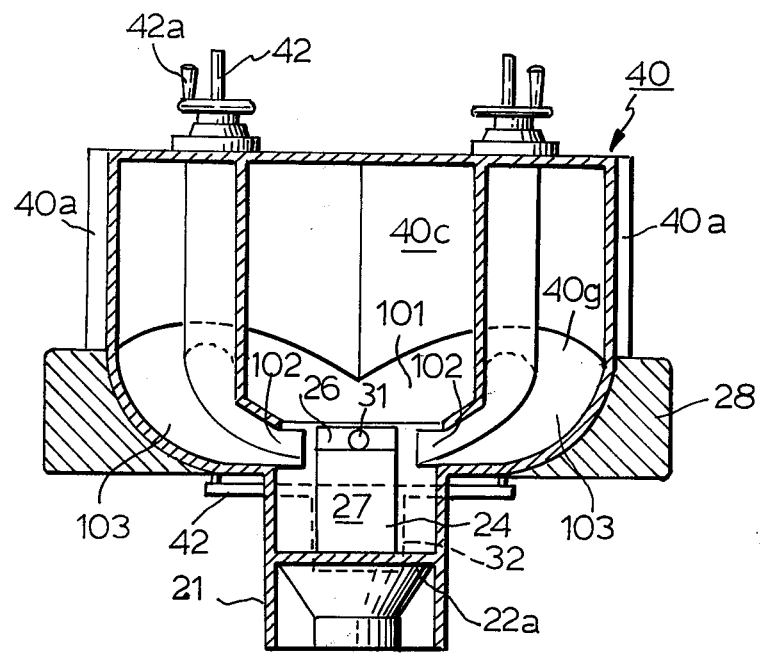
Figure 14:
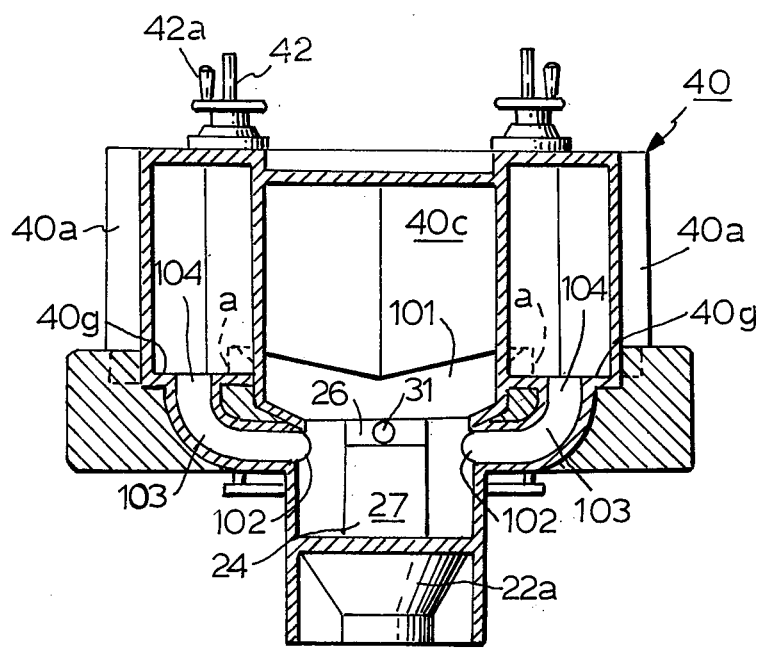
Figure 13:
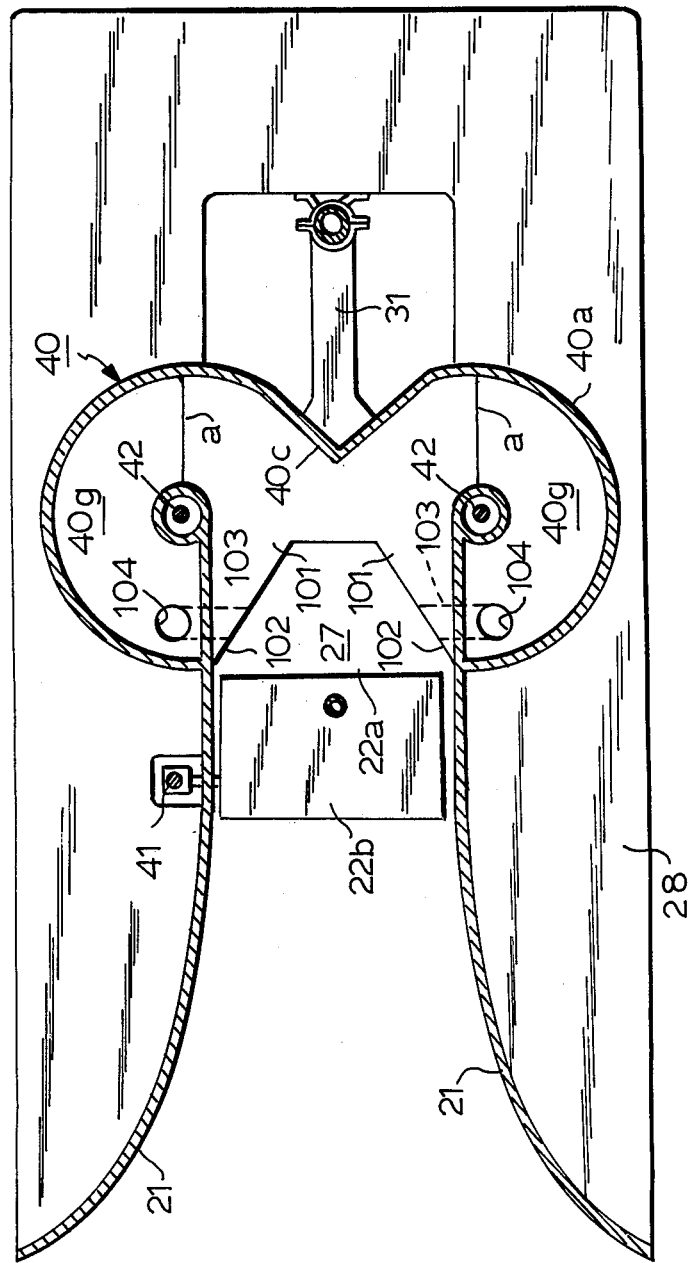

Above-mentioned and other features and objects of the present invention will become more apparent by reference to the following description taken in conjunction with the accompanying drawings, in which:

FIGS. 1 through 7 schematically show one example of the apparatus for collecting effluent oil in the prior art, FIG. 1 being a plan view, FIG. 2 being a longitudinal cross-section view taken along line II—II in FIG. 1, FIG. 3 being another longitudinal cross-section view taken along line III—III in FIG. 1, FIG. 4 being a transverse cross-section view taken along line IV—IV in FIG. 2, FIG. 5 being another transverse cross-section view taken along line V—V in FIG. 2, FIG. 6 being a horizontal cross-section view taken along line VI—VI in FIG. 3, and FIG. 7 being another horizontal cross-section view taken along line VII—VII in FIG. 3;

FIGS. 8 through 11 schematically show a first preferred embodiment of the present invention, FIG. 8 being a plan view partly in cross-section, FIG. 9 being a longitudinal cross-section view taken along line IX—IX in FIG. 8, FIG. 10 being a horizontal cross-section view taken along line X—X in FIG. 9, and FIG. 11 being a transverse cross-section view taken along line XI—XI in FIG. 8; and FIGS. 12 through 14 schematically show a second preferred embodiment of the present invention, FIG. 12 being a longitudinal cross-section view, FIG. 13 being a plan view partly in cross-section, and FIG. 14 being a transverse cross-section view taken along line XIV—XIV in FIG. 12.

Before entering detailed description of the apparatus according to the present invention, description will be made on an apparatus for collecting effluent oil in the prior art with reference to FIGS. 1 through 7. In these figures, reference numeral 21 designates a pair of side plates disposed with their front portions opened forwardly, rear portions arranged in parallel to each other and rear ends closed together backwardly. Reference numerals 22a designates a fixed weir plate having its opposite side edges fixedly secured to the inner wall surfaces of the side plates 21 at their lower rear portions and inclined in the rear-downward direction with its rear edge portion directed vertically (See FIG. 2), and numeral 22b designates a movable weir plate having its rear edge pivotably supported about a horizontal axis at the front edge of the fixed weir plate 22a. Reference numeral 23 designates a backwardly lowering slant plate that is somewhat curved, and the opposite side edges of the slant plate 23 are fixedly secured to the inner wall surface of the side plates 21 at their rear end portions. Reference numerals 24 designates an oil leakage preventing plate, which is disposed between the rear end of the fixed weir plate 22a and the slant plate 23, and the opposite side edges of the oil leakage preventing plate 24 are fixedly secured to the inner wall surfaces of the side plates 21. Between the rear end of the fixed weir plate 22a and the plate 24 is formed a water discharge port 25, while between the slant plate 23 and the plate 24 is formed an oily water intake port 26 of bell-mouth shape. A space delimited by the pair of side plates 21, weir plate 22, slant plate 23 and oil leakage preventing plate 24 forms an oil pool. Reference numeral 28 designates a U-shaped float, whose front portions are fixedly secured to the opposite outer side walls of the left and right side plates, respectively, and are jointly connected at their rear ends. Reference numeral 31 designates an oily water intake pipe, the front end of which forms the oily water intake port 26 opening towards the oil pool 27, and the rear end of which is communicated with a tank on an operation vessel through a flexible pipe and a pump, not shown. Reference numeral 32 designates a sluice valve provided at the water discharge port 25. Reference numeral 33, 34 and 35 designates jet water nozzles, in which the foremost pair of nozzles 33 are provided on the inside of the front portions of the side plates 21 as directed downwardly. The center pair of nozzles 34 are provided on the inside of the middle portions of the side plates 21 as directed downwardly and somewhat backwardly. The rearmost one 35 is provided above the center portion of the oil pool 27 as directed somewhat backwardly. Reference numeral 36 designates a jet water supply pipe for supplying pressurized water to these jet water nozzles 33, 34 and 35. Reference numeral 40 designates a pair of left and right wave buffer chambers, which have a generally cylindrical form having their opposite ends closed and their side walls 40a partly cut away as shown at 40b in FIG. 6, and which are disposed above the slant plate 23 with their center axes directed vertically and the cut-away openings 40b opposed to each other. And, integrally with the side walls 40a, a breakwater plate 40c having an inverse-V-shaped cross-section projects forwardly from the rear ends of the cut-away openings 40b. At the front edges of the cut-away portions 40b, the side walls of the pair of wave buffer chambers 40 extend backwardly and downwardly inside of the side walls 21 as shown at 40d, and in the bottom plates of the extended portions are provided notches 40e. In addition, the top plates of the pair of wave buffer chambers 40 are connected integrally, and at the middle position between the both wave buffer chambers, the front edge 40f of the top plates is curved downwardly. Reference numeral 41 designates a weir height adjusting device which is provided in the vicinity of the front edge of the movable weir plate 22b. Numeral 42 designates a sluice valve actuator, that is mounted to the sluice valve 32 and extends through the wave buffer chamber 40, and a handle 42a is mounted to the top portion of the actuator 42. Reference character A designates a parallel linkage mechanism, in which two pairs of link rods 10a, 10b, 10'a and 10'b having an equal length and disposed in parallel to each other, have their rear ends pivotably mounted to the rear and front portions, respectively, of the upper surface of the U-shaped float 28, and their front ends pivotably supported from members on a vessel (not shown) for operating this effluent oil collecting apparatus. It is to be noted that in FIGS. 2 and 3, reference numeral 17 designates sea water and reference numeral 18 designates an oil layer floating on the sea water 17.

Now description will be made on the operation of the above-described prior art apparatus. An oil collecting head including the side plates 21, weir plate 22, slant plate 23, oil leakage preventing plate 24 and oily water intake pipe 31, floats on the water surface owing to the U-shaped float 28, and although the oil collecting head may move up and down due to variation of the amount of water or the wave within the oil pool 27, it is allowed only to translate with its direction relative to the hull of the operation vessel always kept constant, because it is connected to the hull by means of the two pairs of link rods 10a, 10b, 10'a and 10'b having an equal length and disposed in parallel to each other. Accordingly, even in case that the water surface is waving, it would never occur that only the oil collecting head is subjected to pitching at a relatively high frequency, but it would be inclined always by the same angle as the hull of the operation vessel having a large inertia. In addition, since the ratio of weight to water line area of the float 28 is small, and since the center of buoyancy is positioned in the vicinity of the oily water intake port 26, the relative water level in the vicinity of the oily water intake port 26 would be varied little, even when the oil collecting head is rocking.

When the operation vessel navigates leftwardly as viewed in FIGS. 1 to 3, the oil collecting head also moves leftwardly, so that the sea water 17 having the oil layer 18 floated thereon can be collected by the forwardly opened side plate 21, and flows into the oil pool 27 beyond the weir plate 22. Since this weir plate 22 is severed into a fixed weir plate 22a and a movable weir plate 22b, and since the height of the front edge of the movable weir plate 22b is adjustable by means of the weir height adjusting device 41, the inflow rate of the oily water into the oil pool 27 can be controlled by appropriately adjusting the height of the weir depending upon a thickness of an oil layer, a speed of a vessel, a suction capability of a pump, etc.

Then, owing to the jet water ejected backwardly from the jet water nozzle 34, the oil is fluidized to promote the inflow of the oily water, and also adhesion of the oil onto the side plates 21 can be prevented.

The oil collected together with the sea water in the oil pool 27 and condensed into a thicker layer, is collected in a tank on the vessel through the oily water intake port 26 and the oily water intake pipe 31 by means of a pump not shown, as represented by a dash-line arrow in FIG. 2. At this time, the oil is fluidized by the jet water ejected from the jet water nozzles 35, and thereby blocking of the oily water intake port 26 caused by highly viscous oil and adhesion of the oil onto the wall surfaces can be prevented.

On the other hand, the sea water 17 in the lower layer is discharged externally through the water discharge port 25. In this case, since the rear edge portion of the weir plate 22a is directed vertically, the sea water flowing along the lower surface of the weir plate 22a is accelerated when making a detour around this vertical portion, resulting in lowering of a pressure, so that the sea water in the oil pool 27 can be sucked and outflow of the sea water through the water discharge port 25 can be promoted.

In addition, since the wave buffer chambers 40 are provided, even in case that a large amount of oily water flows momentarily into the oil pool 27 beyond the movable weir 22b due to waves, and is struck against the oily water intake port 26 or its neighborhood, the excessive oily water is at first severed by the breakwater plate 40c into the left and right halves, which are introduced into the respective wave buffer chambers 40 through the cut-away openings 40b of the side walls 40a. The introduced oily water revolves along the inner surface of the side wall 40a, and after it has been given a backward speed component by the extended portion 40d of the side wall, it falls through the notches 40e of the bottom plates towards the oil pool 27 and the oily water intake port 26. In addition, the oily water having jumped up to the top plate of the wave buffer chamber 40 is also diverted by the curved portion at the front edge 40f of the top plate so as to be directed in the rear-downward direction and thus returned to the oil pool 27. In this way, the agitation phenomenon of the inflow water directed in the up and down directions and in the forth and back directions caused by striking of waves, can be mitigated, and the energy and reaction-forces are well offset, so that the collection of oil can be achieved efficiently even under a waved condition.

It is to be noted that in this prior art apparatus, when the operation vessel is stopped, the reverse flow of sea water through the water discharge port 25 into the oil pool 27 can be prevented by closing the sluice valve 32 with the sluice valve actuator 42.

While the above-described effluent oil collecting apparatus in the prior art could achieve the effect of collecting effluent oil to a certain extent, it had a disadvantage that since the slant plate 23 was provided as inclined in a rear-downward direction, the wave striking against the slant plate 23 might be possibly reflected forwardly or a forwardly traveling wave might be possibly generated by the upward and downward movements of the entire apparatus, resulting in the phenomenon that the collected oil which had once entered the oil pool would be forced back in the forward direction, and after all, the collecting efficiency for the effluent oil was lowered. Furthermore, there was an additional disadvantage that since the inlet port and outlet port of the wave buffer chambers 40 were provided in common, the oily water flowing into the wave buffer chambers 40 might possibly collide against the oily water flowing out of the wave buffer chambers 40, and thereby smooth flow of the oil layer 18 on the surface of the water 17 in the oil pool 27 into the oil tank on the operation vessel, was prevented.

Now a first preferred embodiment of the present invention will be described in greater detail with reference to FIGS. 8 through 11. In these figures, reference numeral 21 designates a pair of left and right side plates, numeral 22a designates a fixed weir plate, numeral 22b designates a movable weir plate, numeral 24 designates an oil leakage preventing plate, numeral 25 designates a water discharge port, numeral 26 designates an oily water intake port, numeral 27 designates an oil pool, numeral 28 designates a float, numeral 31 designates an oily water intake pipe, numeral 32 designates a sluice valve, numerals 33, 34 and 35 designate jet water nozzles, numeral 36 designates a jet water supply pipe, numeral 40 designates wave buffer chambers, numeral 40a designates a side wall of the wave buffer chamber 40, numeral 40c designates a breakwater plate, numeral 41 designates a weir height adjusting device, and numeral 42 designates a sluice valve actuator. The constructions, functions and mutual structural relations of the above-referred respective members are substantially the same as those of the above-described effluent oil collecting apparatus in the prior art, except for the constructions and functions of the wave buffer chambers 40 and the slant plate (The equivalent parts are given like reference numerals.).

Reference numeral 101 designates slant plates disposed above the oily water intake port 26 on its left and right sides and led into the wave buffer chambers 40 in a rear-upward direction, and these slant plates 101 continue to the bottom plates 40g of the wave buffer chambers 40. These bottom plates 40g are inclined downwardly from their top portions depicting looped slopes to form water conduit paths 103 leading to discharge ports 102 which open in the oil pool 27 under the above referred slant plates 101.

The apparatus for collecting effluent oil according to the present invention is constructed as described above, so that when this apparatus has reached an oil effluent region as tugged by a tug boat or the like and starts the oil collecting opertion, even if a large wave should invade into the oil pool 27 beyond the movable weir plate 22b, the wave would rise along the slant plates 101 and would be led into the wave buffer chambers 40, where the waved water revolves along the side walls 40a, passes through the water conduit paths 103 and smoothly flows into the oil pool 27 from the discharge ports 102. In this way, the oil which has flowed into the oil pool 27, is passed to the oily water intake pipe 31 through the oily water intake port 26, and then is collected in a tank on an operation vessel.

Since the apparatus according to the present invention has the aforementioned construction and function, the present invention can eliminate every shortcoming and every disadvantage of the prior art apparatus, and can achieve a practically useful effect that effluent oil can be collected efficiently.

A second preferred embodiment of the present invention illustrated in FIGS. 12 to 14 is different from the above-described first preferred embodiment only in that the slant plates 101 led into the wave buffer chambers 40 in a rear-upward direction fall vertically (being stepped) at the positions marked (a) and then continue to the bottom plates 40g, and that apertures 104 are provided in the front portions of the bottom plates 40g and water conduit paths 103 are formed from these apertures 104 towards discharge ports 102 under the slant plates 101, and these two preferred embodiments can achieve the same functions and effects.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. An apparatus for collecting effluent oil including a pair of left and right side plates disposed at a predetermined distance in a forwardly opened arrangement, a weir plate mounted to said side plates as inclined in a rear-downward direction so that its opposite side edges may contact with the inner wall surfaces of said respective side plates under a water surface, a slant plate disposed with its rear end positioned above the rear end of said weir plate at the rear ends of said side plates and having its opposite side edges fixedly secured to the inner wall surfaces of said side plates, an oil leakage preventing plate positioned in the midway between the rear end of said weir plate and the rear end of said slant plate and having its opposite side edges fixedly secured to the inner wall surfaces of said side plates to form a water discharge port between said oil leakage preventing plate and the rear end of said weir plate and to form an oily water intake port between said oil leakage preventing plate and the rear end of said slant plate, an oily water intake pipe communicated with said oily water intake port, a pair of left and right wave buffer chambers which are of substantially cylindrical shape having their top and bottom ends closed and having their side walls partly cut away, and float means mounted to said side plates; characterized in that said slant plate is appropriately inclined in an obliquely rear-upward direction with its rear end extended into said wave buffer chambers, and that between said wave buffer chambers and an oil pool formed as delimited by said side plates, weir plate and oil leakage preventing plate, is provided a water conduit path for communicating therebetween.

* * * * *